(12) United States Patent
Hinson et al.

(10) Patent No.: US 10,933,778 B1
(45) Date of Patent: Mar. 2, 2021

(54) ROLLING CAR SEAT ASSEMBLY

(71) Applicants: Pattie Hinson, Fredericksburg, VA (US); Bobby Hinson, Fredericksburg, VA (US)

(72) Inventors: Pattie Hinson, Fredericksburg, VA (US); Bobby Hinson, Fredericksburg, VA (US)

( * ) Notice: Subject to any disclaimer, the term of this patent is extended or adjusted under 35 U.S.C. 154(b) by 0 days.

(21) Appl. No.: 16/552,462

(22) Filed: Aug. 27, 2019

(51) Int. Cl.
*B60N 2/26* (2006.01)
*B60N 2/28* (2006.01)
*B62B 9/20* (2006.01)
*B62B 7/04* (2006.01)

(52) U.S. Cl.
CPC ......... *B60N 2/2848* (2013.01); *B60N 2/2821* (2013.01); *B60N 2/2845* (2013.01); *B62B 7/04* (2013.01); *B62B 9/20* (2013.01)

(58) Field of Classification Search
CPC ... B60N 2/2821; B60N 2/2845; B60N 2/2848
USPC .......................... 297/118, 130, 250.1–256.16
See application file for complete search history.

(56) References Cited

U.S. PATENT DOCUMENTS

| | | | | |
|---|---|---|---|---|
| 3,659,865 A | * | 5/1972 | Nothacker | B60N 2/286 297/118 X |
| 4,113,306 A | * | 9/1978 | von Wimmersperg | B60N 2/2824 297/130 X |
| 4,570,956 A | * | 2/1986 | Dyer | B62B 7/12 297/130 X |
| 4,685,688 A | * | 8/1987 | Edwards | B60N 2/2839 297/130 X |
| 4,822,064 A | * | 4/1989 | Hunter | B60N 2/2821 280/30 |
| 4,828,281 A | * | 5/1989 | Sanchas | B60N 2/2848 280/250 |
| 4,832,354 A | * | 5/1989 | LaFreniere | B60N 2/2848 297/130 X |
| 4,872,693 A | * | 10/1989 | Kennel | B60N 2/2845 280/30 |
| 4,874,182 A | * | 10/1989 | Clark | B62B 7/12 297/130 X |
| 4,878,680 A | * | 11/1989 | Molnar | B62B 7/12 297/130 X |
| 4,896,894 A | * | 1/1990 | Singletary | B60N 2/2845 280/30 |
| 4,902,026 A | * | 2/1990 | Maldonado | B60N 2/2848 297/130 X |
| 4,946,180 A | * | 8/1990 | Baer | A47D 1/06 280/39 |
| 4,989,888 A | * | 2/1991 | Qureshi | B60N 2/2848 297/254 X |

(Continued)

*Primary Examiner* — Rodney B White

(57) ABSTRACT

A rolling car seat assembly includes a seat base that is positionable on a vehicle seat. The seat base has a plurality of wheel wells therein. A car seat is provided that has a child seated therein. The car seat is positionable in a seated position or a rolling position. A plurality of rollers is each rotatably coupled to the car seat. Each of the rollers is positioned in a respective one of the wheel wells in the seat base when the car seat is positioned in the seated position. Each of the rollers rolls along a support surface when the car seat is positioned in the rolling position to transport the child without requiring the child to be carried. A handle is slidably coupled to the car seat for gripping to roll the car seat.

5 Claims, 5 Drawing Sheets

(56) References Cited

U.S. PATENT DOCUMENTS

| | | | | |
|---|---|---|---|---|
| 5,022,669 A * | 6/1991 | Johnson | B60N 2/2806 | |
| | | | 297/250.1 X | |
| 5,104,134 A * | 4/1992 | Cone | B60N 2/2848 | |
| | | | 297/255 X | |
| 5,149,113 A * | 9/1992 | Alldredge | B62B 7/12 | |
| | | | 297/130 X | |
| 5,318,311 A * | 6/1994 | Bofill | B60N 2/2848 | |
| | | | 280/30 | |
| 5,398,951 A * | 3/1995 | Ryu | B60N 2/2848 | |
| | | | 280/30 | |
| 5,403,022 A * | 4/1995 | Snider | B60N 2/2848 | |
| | | | 280/30 | |
| 5,431,478 A * | 7/1995 | Noonan | B60N 2/2848 | |
| | | | 297/130 | |
| 5,595,393 A * | 1/1997 | Batten | B60N 2/2845 | |
| | | | 280/30 | |
| 5,707,106 A * | 1/1998 | Clark | B60N 2/2806 | |
| | | | 297/130 X | |
| 5,772,279 A | 6/1998 | Johnson, Jr. | | |
| 5,823,547 A * | 10/1998 | Otobe | B60N 2/2839 | |
| | | | 280/30 | |
| 5,829,826 A * | 11/1998 | Ziccardi | A47D 1/06 | |
| | | | 297/118 | |
| 5,865,447 A | 2/1999 | Huang | | |
| 5,893,606 A * | 4/1999 | Chiang | A47D 1/004 | |
| | | | 297/118 X | |
| 6,017,088 A * | 1/2000 | Stephens | A47D 13/02 | |
| | | | 297/130 X | |
| 6,027,163 A | 2/2000 | Longneck | | |
| 6,237,995 B1 * | 5/2001 | Dierickx | B60N 2/2848 | |
| | | | 297/130 X | |
| 6,296,259 B1 * | 10/2001 | Anderson | B60N 2/2806 | |
| | | | 280/30 | |
| 6,302,412 B1 | 10/2001 | Worth | | |
| 6,367,821 B2 * | 4/2002 | Thiele | B60N 2/2839 | |
| | | | 280/30 | |
| 6,612,645 B1 * | 9/2003 | Hsu | B62B 7/12 | |
| | | | 297/130 X | |
| 6,695,400 B2 | 2/2004 | Washizuka | | |
| 6,729,630 B2 | 5/2004 | Szmidt | | |
| 6,854,744 B2 * | 2/2005 | Brandler | B60N 2/2845 | |
| | | | 280/30 | |
| D508,220 S | 8/2005 | Spriggs | | |
| 6,938,915 B2 * | 9/2005 | Bischoff | B60N 2/2806 | |
| | | | 280/47.25 | |
| 6,971,655 B1 * | 12/2005 | Harris | B60N 2/2806 | |
| | | | 297/250.1 X | |
| 6,976,685 B1 * | 12/2005 | King | B60N 2/2806 | |
| | | | 280/30 | |
| 6,986,518 B1 * | 1/2006 | Besaw | B60N 2/2812 | |
| | | | 280/30 | |
| 7,090,291 B2 * | 8/2006 | Birchfield | B60N 2/2845 | |
| | | | 297/118 X | |
| 7,100,976 B1 * | 9/2006 | Desalve | A45C 13/385 | |
| | | | 297/130 X | |
| 7,311,353 B1 * | 12/2007 | Johnson | A47D 13/02 | |
| | | | 297/256.16 X | |
| 7,338,122 B2 * | 3/2008 | Hei | B60N 2/2806 | |
| | | | 297/256.12 | |
| 7,354,049 B2 * | 4/2008 | Schmidt | A45C 9/00 | |
| | | | 280/33.993 | |
| 7,506,921 B1 * | 3/2009 | Sigmon, Jr. | B60N 2/2848 | |
| | | | 297/130 X | |
| 7,517,011 B2 | 4/2009 | Aliev | | |
| 7,540,507 B1 * | 6/2009 | Kennedy | B60N 2/2821 | |
| | | | 280/30 | |
| 7,543,886 B2 * | 6/2009 | Gutierrez-Hedges | | |
| | | | B60N 2/2845 | |
| | | | 297/118 X | |
| 7,559,606 B2 * | 7/2009 | Hei | B60N 2/2806 | |
| | | | 297/256.16 X | |
| 7,600,766 B2 * | 10/2009 | Erskine | B60N 2/2806 | |
| | | | 280/47.17 | |
| 8,434,781 B2 * | 5/2013 | Mazar | B60N 2/2863 | |
| | | | 280/648 | |
| 8,511,749 B2 * | 8/2013 | Hei | B60N 2/2806 | |
| | | | 297/256.16 | |
| 8,544,941 B2 * | 10/2013 | Coote | B62B 7/006 | |
| | | | 297/118 | |
| 9,227,536 B1 * | 1/2016 | Cary | B62B 7/12 | |
| 9,227,648 B2 | 1/2016 | Sundberg | | |
| 9,260,039 B1 * | 2/2016 | Satterfield | B60N 2/2821 | |
| 9,738,181 B1 * | 8/2017 | Termini | B62B 7/12 | |
| 10,052,981 B2 * | 8/2018 | Wright | A47C 7/66 | |
| 10,427,558 B1 * | 10/2019 | Dickens | B60N 2/2848 | |
| 2002/0060444 A1 * | 5/2002 | Cote | B60N 2/2806 | |
| | | | 280/648 | |
| 2003/0015894 A1 * | 1/2003 | Bargery | B60N 2/2848 | |
| | | | 297/118 | |
| 2003/0209885 A1 * | 11/2003 | Szmidt | B60N 2/2806 | |
| | | | 280/652 | |
| 2004/0075229 A1 | 4/2004 | Huntley | | |
| 2004/0124674 A1 * | 7/2004 | Birchfield | B60N 2/2845 | |
| | | | 297/130 | |
| 2004/0173997 A1 * | 9/2004 | Voll | A47C 7/006 | |
| | | | 280/652 | |
| 2009/0289478 A1 * | 11/2009 | Piserchio | B62B 7/12 | |
| | | | 297/118 | |
| 2010/0019547 A1 * | 1/2010 | Gray | B60N 2/2845 | |
| | | | 297/118 | |
| 2013/0285420 A1 * | 10/2013 | Buzaglo | B60N 2/286 | |
| | | | 297/118 | |
| 2018/0009341 A1 * | 1/2018 | Carlile | B60N 2/2848 | |

* cited by examiner

ROLLING CAR SEAT ASSEMBLY

CROSS-REFERENCE TO RELATED APPLICATIONS

Statement Regarding Federally Sponsored Research or Development

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to seat assemblies and more particularly pertains to a new seat assembly for being positioned on a vehicle seat or being rolled along a support surface.

BRIEF SUMMARY OF THE INVENTION

An embodiment of the disclosure meets the needs presented above by generally comprising a seat base that is positionable on a vehicle seat. The seat base has a plurality of wheel wells therein. A car seat is provided that has a child seated therein. The car seat is positionable in a seated position or a rolling position. A plurality of rollers is each rotatably coupled to the car seat. Each of the rollers is positioned in a respective one of the wheel wells in the seat base when the car seat is positioned in the seated position. Each of the rollers rolls along a support surface when the car seat is positioned in the rolling position to transport the child without requiring the child to be carried. and A handle is slidably coupled to the car seat for gripping to roll the car seat.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
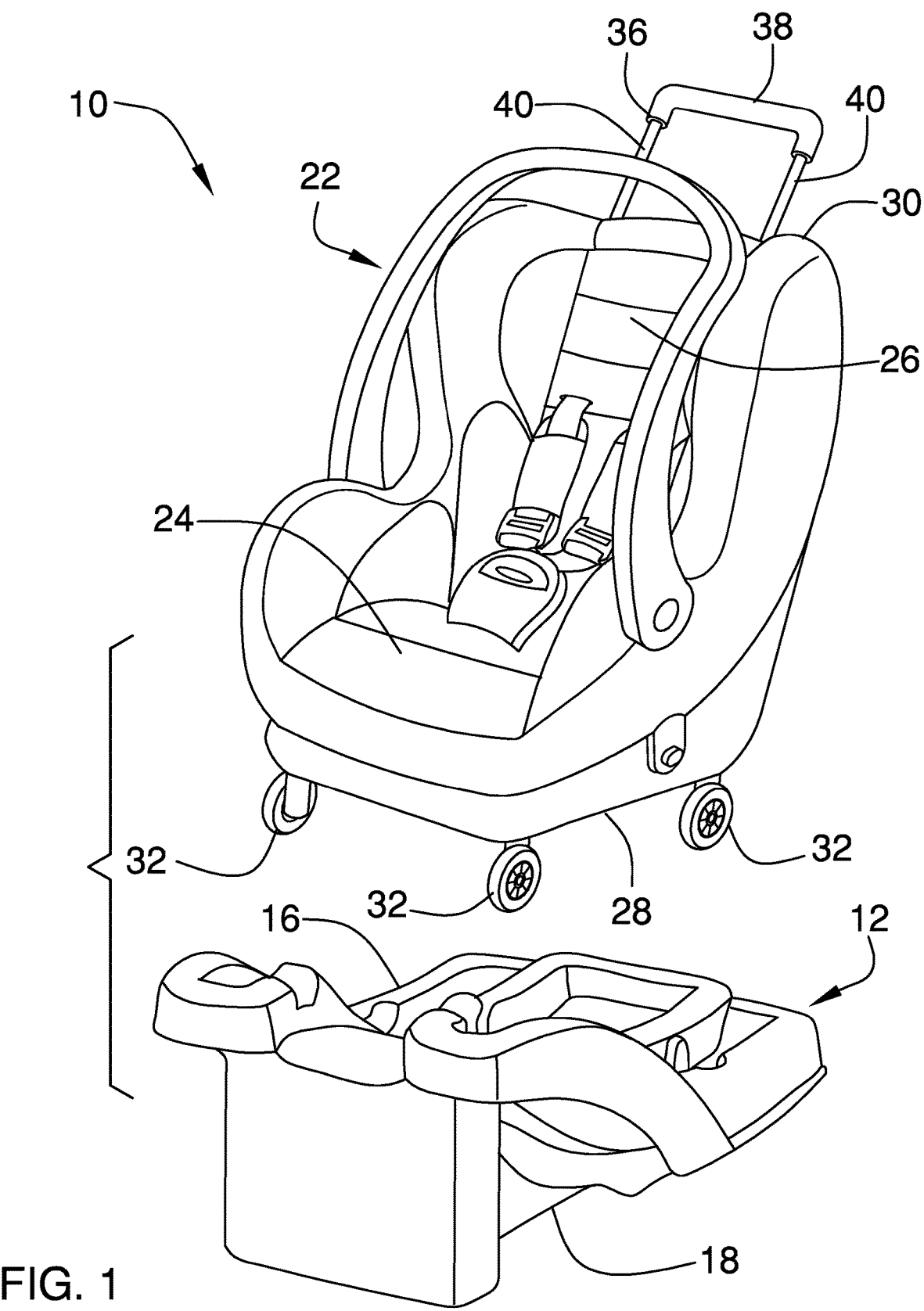
FIG. 1 is a perspective view of a rolling car seat assembly according to an embodiment of the disclosure.
Figure 2:
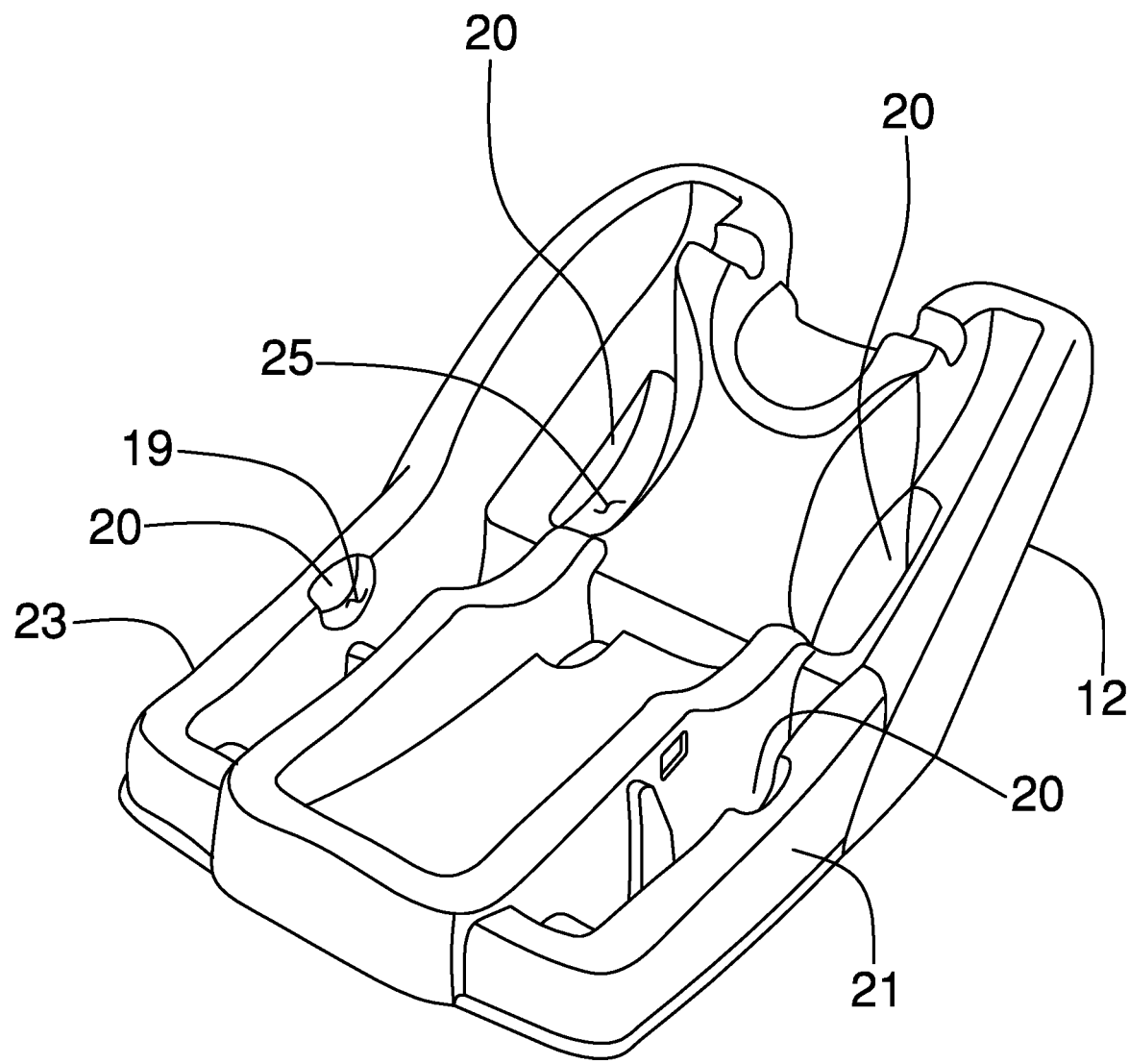
FIG. 2 is a top perspective view of a seat base of an embodiment of the disclosure.
Figure 3:
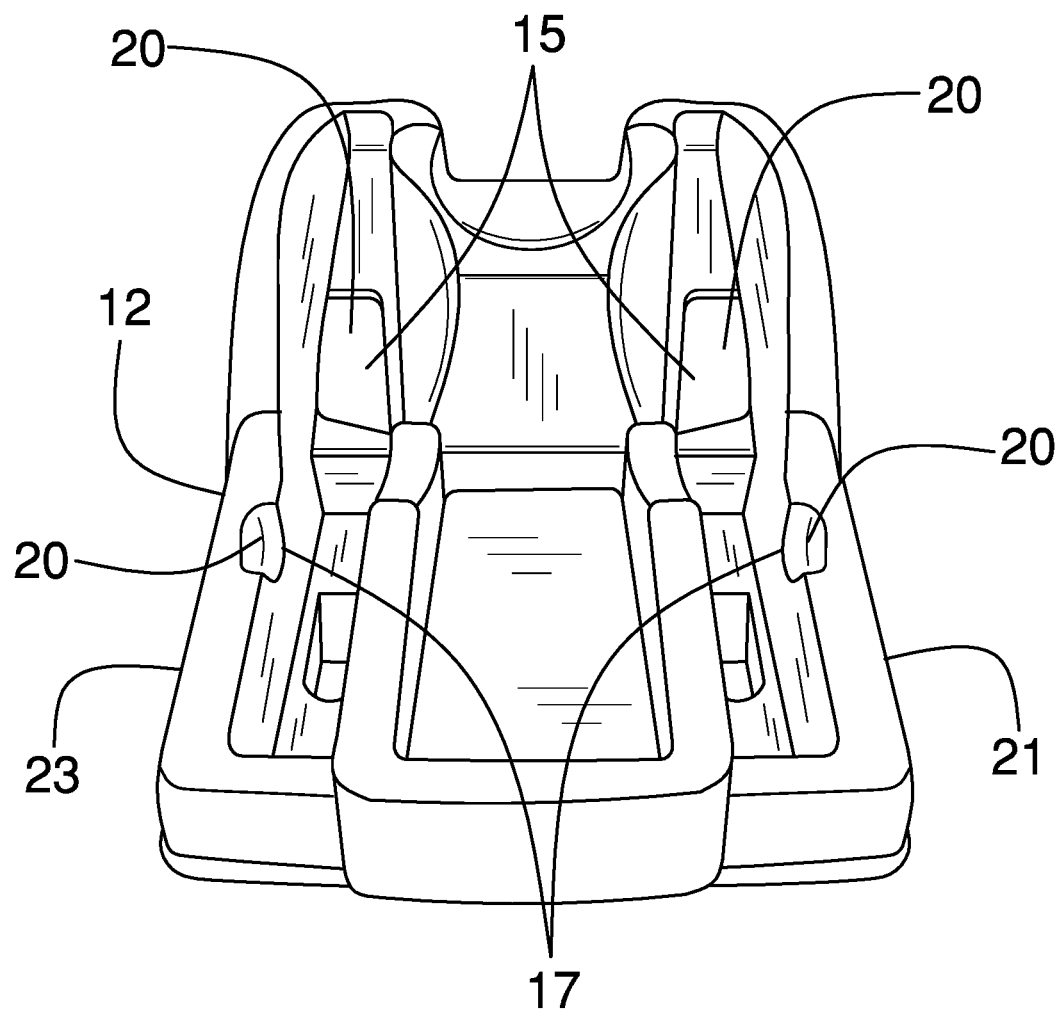
FIG. 3 is a perspective view of a seat base of an embodiment of the disclosure.
Figure 4:
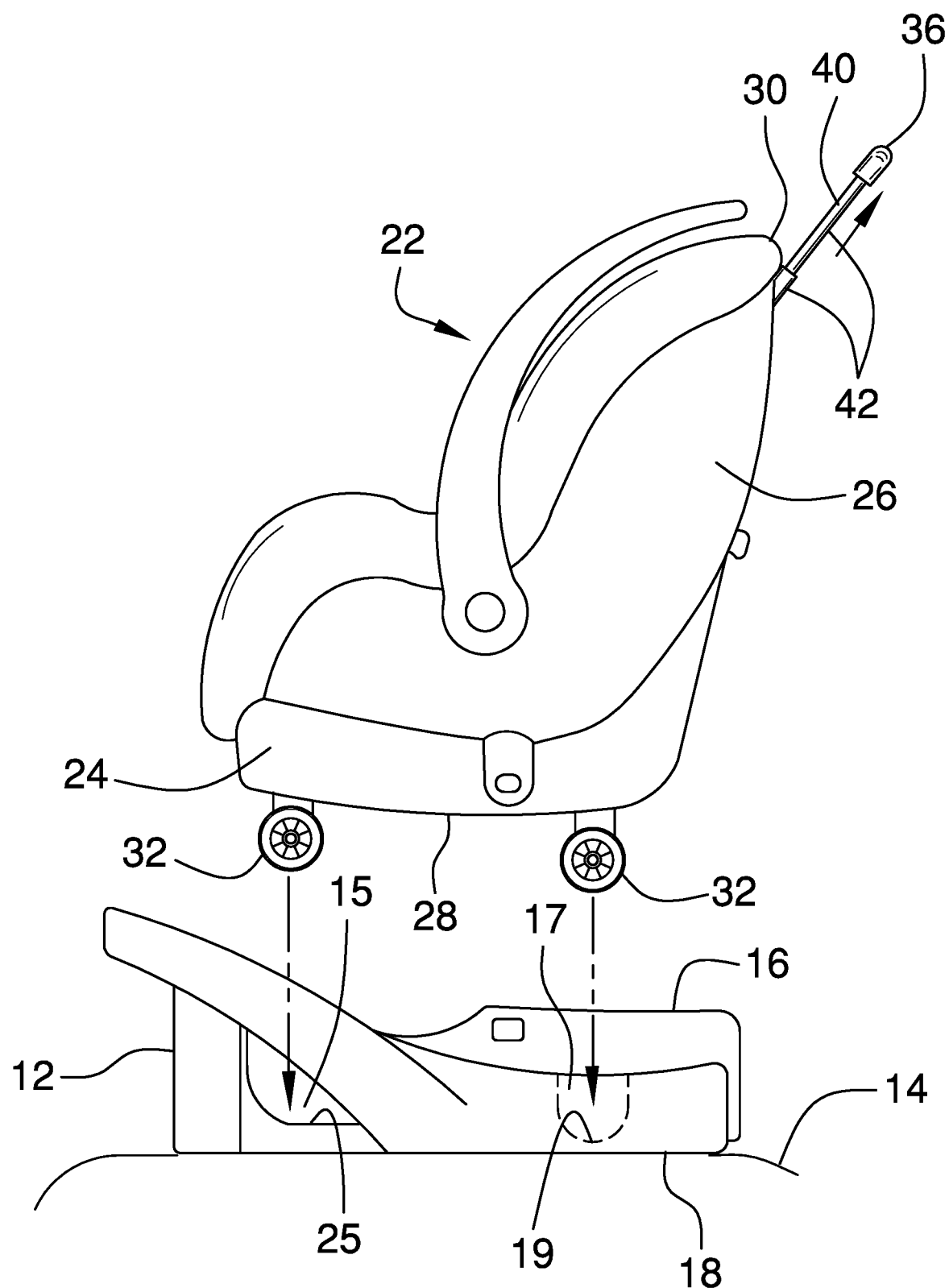
FIG. 4 is an exploded perspective view of an embodiment of the disclosure.
Figure 5:
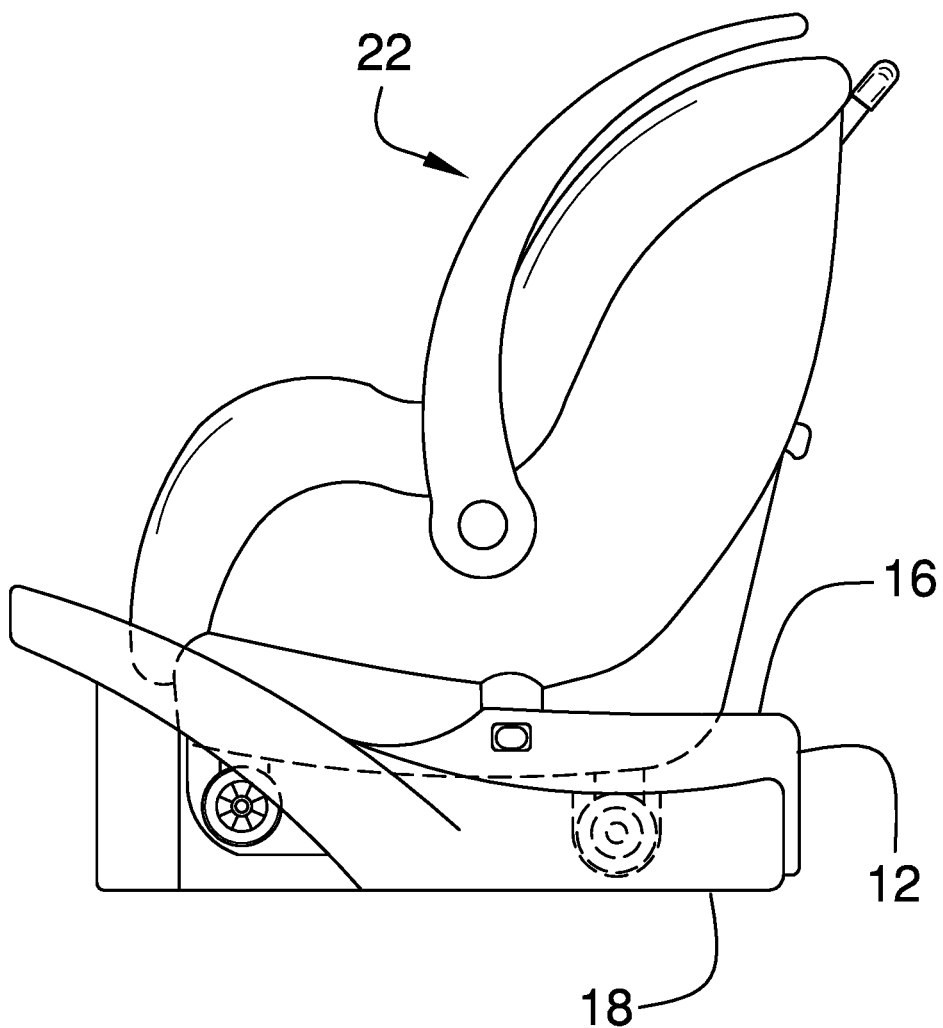
FIG. 5 is a phantom view of an embodiment of the disclosure showing a car seat being positioned in a seated position.

With reference now to the drawings, and in particular to FIGS. 1 through 5 thereof, a new seat assembly embodying the principles and concepts of an embodiment of the disclosure and generally designated by the reference numeral 10 will be described.

As best illustrated in FIGS. 1 through 5, the rolling car seat assembly 10 generally comprises a seat base 12 that is positionable on a vehicle seat 14. The seat base 12 has a top side 16 and a bottom side 18, and the bottom side 18 rests on the vehicle seat 14. The top side 16 has a plurality of wheel wells 20 each extending toward the bottom side 18. The plurality of wheel wells 20 are arranged to define a respective one of four corners of a rectangle. The seat base 12 may have structural features related to seat bases of any conventional design. Additionally, the vehicle seat 14 may be in a motorized vehicle, such as a passenger vehicle or the like.

The plurality of wheel wells 20 includes a set of front wheel wells 15 and a set of rear wheel wells 17. The rear wheel wells 17 has a lower bounding surface 19 and the lower bounding surface 19 of each of the rear wheel wells 17 is concavely arcuate with respect to the top side 16 of the seat base 12. Each of the rear wheel wells 17 may be aligned with a respective one of a first lateral side 21 and a second lateral side 23 of the seat base 12. Each of the front wheel wells 15 has a lower bounding surface 25 and the lower bounding surface 25 of each of the front wheel wells 15 is curved such that each of the front wheel wells 15 has a half moon shape.

A car seat 22 is provided and a child can be seated in the car seat 22. The car seat 22 is positionable in a seated position having the car seat 22 being removably positioned on the seat base 12. In this way the car seat 22 is secured to the vehicle seat 14. The car seat 22 is positionable in a rolling position having the car seat 22 being removed from the seat base 12. The car seat 22 has seat portion 24 and a backrest portion 26. The seat portion 24 has a bottom surface 28 and the backrest portion 26 has an upper edge 30. Additionally, the car seat 22 may be a car seat 22 of any conventional design that is designed to be used with a removable seat base 12.

A plurality of rollers 32 is provided and each of the rollers 32 is rotatably coupled to the car seat 22. Each of the rollers 32 is positioned in a respective one of the wheel wells 20 in the seat base 12 when the car seat 22 is positioned in the seated position. Additionally, each of the rollers 32 rolls along a support surface when the car seat 22 is positioned in the rolling position. In this way the car seat 22 can transport the child without requiring the child to be carried. Each of the rollers 32 is positioned on the bottom surface 28 of the seat portion 24 of the car seat 22 and each of the rollers 32 is aligned with a respective one of four corners of the seat portion 24. Each of the rollers 32 may comprise, but not be limited to, a caster, a wheel or any other type of roller commonly associated with strollers. Additionally, each of the rollers 32 may have a maximum diameter of 3.0 inches to facilitate the wheel wells 20 in the seat base 12 to accommodate the rollers 32.

A handle 36 is slidably coupled to the car seat 22. The handle 36 is positionable in a deployed position when the car seat 22 is positioned in the rolling position. In this way the handle 36 can be gripped for rolling the car seat 22. The handle 36 is positionable in a stored position when the car seat 22 is positioned in the seated position. The handle 36 comprises a central member 38 that extends between a pair of outward members 40. Each of the outward members 40 is slidably positioned in the backrest portion 26 of the car seat 22 having the central member 38 being spaced from the upper edge 30 of the backrest portion 26. Each of the outward members 40 comprises a plurality of slidable sections 42 such that each of the outward members 40 has a telescopically adjustable length.

In use, the car seat 22 is positioned in the seat base 12 and the handle 36 is positioned in the stored position. In this way the child can be seated in the car seat 22 for travelling in the vehicle. The car seat 22 is removed from the seat base 12, the car seat 22 is placed on the ground and the handle 36 is positioned in the deployed position. In this way the car seat 22 can transport the child in the convention of a stroller. Moreover, the child can be transported without requiring a caregiver to carry the child or the car seat 22.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A rolling car seat assembly being configured to have a child seated therein for travelling in a car or being rolled in the convention of a stroller, said assembly comprising:
   a seat base being positionable on a vehicle seat, said seat base having a plurality of wheel wells therein;
   a car seat configured to have a child seated therein, said car seat being positionable in a seated position having said car seat being removably positioned on said seat base for securing said car seat to the vehicle seat, said car seat being positionable in a rolling position having said car seat being removed from said cart seat, said car seat having a seat portion and a backrest portion, said seat portion having a bottom surface, said backrest portion having an upper edge;
   a plurality of rollers, each of said rollers being rotatably coupled to said car seat, each of said rollers being positioned in a respective one of said wheel wells in said seat base when said car seat is positioned in said seated position, each of said rollers being for rolling along a support surface when said car seat is positioned in said rolling position wherein said car seat is configured to transport the child without requiring the child to be carried, each of said rollers being positioned on a fixed vertical support wherein each roller is in a position spaced under said bottom surface of said seat portion of said car seat, each of said rollers being aligned with a respective one of four corners of said seat portion; and
   a handle being slidably coupled to said car seat, said handle being positionable in a deployed position when said car seat is positioned in said rolling position wherein said handle is configured to be gripped for rolling said car seat, said handle being positionable in a stored position when said car seat is positioned in said seated position.

2. The assembly according to claim 1, wherein said seat base has a top side and a bottom side, said bottom side resting on the vehicle seat, said top side having said plurality of wheel wells each extending toward said bottom side, said plurality of wheel wells being arranged to define a respective one of four corners of a rectangle.

3. The assembly according to claim 2, wherein:
   said car seat has a seat portion and a backrest portion, said seat portion having a bottom surface, said backrest portion having an upper edge; and
   said handle comprising a central member extending between a pair of outward members, each of said outward members being slidably positioned in said backrest portion of said car seat having said central member being spaced from said upper edge of said backrest portion.

4. A rolling car seat assembly being configured to have a child seated therein for travelling in a car or being rolled in the convention of a stroller, said assembly comprising:
   a seat base being positionable on a vehicle seat, said base having a top side and a bottom side, said bottom side resting on the vehicle seat, said top side having a plurality of wheel wells each extending toward said bottom side, said plurality of wheel wells being arranged to define a respective one of four corners of a rectangle;
   a car seat configured to have a child seated therein, said car seat being positionable in a seated position having said car seat being removably positioned on said seat base for securing said car seat to the vehicle seat, said car seat being positionable in a rolling position having said car seat being removed from said cart seat, said car seat having seat portion and a backrest portion, said seat portion having a bottom surface, said backrest portion having an upper edge;

a plurality of rollers, each of said rollers being rotatably coupled to said car seat, each of said rollers being positioned in a respective one of said wheel wells in said seat base when said car seat is positioned in said seated position, each of said rollers being for rolling along a support surface when said car seat is positioned in said rolling position wherein said car seat is configured to transport the child without requiring the child to be carried, each of said rollers being positioned on a fixed vertical support wherein each roller is in a position spaced under said bottom surface of said seat portion of said car seat, each of said rollers being aligned with a respective one of four corners of said seat portion; and a handle being slidably coupled to said car seat, said handle being positionable in a deployed position when said car seat is positioned in said rolling position wherein said handle is configured to be gripped for rolling said car seat, said handle being positionable in a stored position when said car seat is positioned in said seated position, said handle comprising a central member extending between a pair of outward members, each of said outward members being slidably positioned in said backrest portion of said car seat having said central member being spaced from said upper edge of said backrest portion.

5. A method of facilitating a child to travel in a vehicle or to be rolled along a support surface in the convention of a stroller, the steps of the method comprising:

providing a seat base having a plurality of wheel wells therein;

placing said seat base on a seat of a vehicle;

providing a car seat being configured to have a child seated therein;

placing said car seat in a rolling position having said car seat being removed from said seat base wherein said car seat is configured to roll the child along the support surface;

placing said car seat in a seated position having said car seat engaging said seat base wherein said car seat is configured to facilitate the child to safely travel in the vehicle;

providing a plurality of rollers, each of said rollers being positioned on a fixed vertical support wherein each roller is in a position spaced under a bottom surface of a seat portion of said car seat, each of said rollers rolling along a support surface when said car seat is positioned in said rolling position for transporting the child, each of said rollers being positioned in a respective one of said wheel wells when said car seat is positioned in said seated position;

providing a handle being slidably coupled to said car seat;

placing said handle in a deployed position when said car seat is positioned in said rolling position wherein said handle is configured to be gripped by a care giver for rolling said car seat; and placing said handle in a stored position when said car seat is positioned in said seated position.

* * * * *